March 7, 1939.   C. E. WUENSCH   2,149,877
SCREENING
Filed May 28, 1936
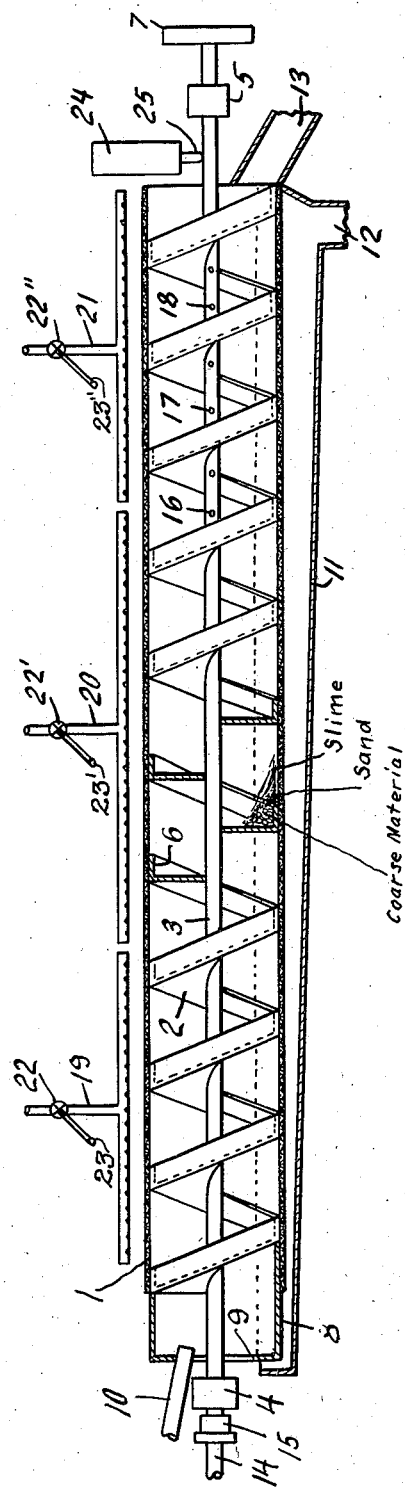
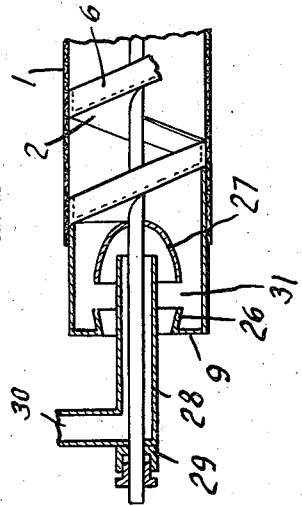
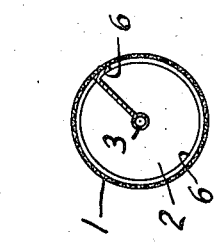
INVENTOR
Charles Erb Wuensch
BY
Pennie, Davis, Marvin and Edmonds
ATTORNEYS Patented Mar. 7, 1939

2,149,877

UNITED STATES PATENT OFFICE 2,149,877

SCREENING

Charles Erb Wuensch, Joplin, Mo.

Application May 28, 1936, Serial No. 82,203

3 Claims. (Cl. 209—270)

This invention is concerned with screening relatively fine solid particles out of a mixture of coarse and fine particles and liquid (pulp). In particular, the invention contemplates a rotating cylindrical screen of improved design adapted for wet screening.

Fine screening operations are difficult and expensive for several reasons. Chief among these is the excessive abrasion of fine mesh screen cloth by particles too coarse to pass through the screen. Secondly, the small openings in the screen easily become blinded due to the lodging of medium size particles therein. Thirdly, in the case of wet screening, the capillary effect of the small holes in the screen tends to prevent the liquid carrying the fine particles from passing through the screen. In other words, liquid tends to run over rather than through a fine screen, say one containing 40 or more meshes to the linear inch.

As a result of my investigations I have developed a screen mechanism which reduces abrasive effect to a marked degree and does not blind. Moreover, water passes through the screen rather than over it.

I use the term "fine screen" to include those containing about 40 or more meshes to the linear inch. With screens of coarser mesh, the effect of capillarity is relatively unimportant. Moreover, the coarser screens are sturdier and withstand more abrasion than the finer screens, and with these coarser screens blinding is not so serious a problem.

The apparatus of my invention has a high capacity. It may be employed in practically any fine wet screening operation and may also be used in place of hydraulic classifiers.

Essentially the apparatus of my invention comprises a continuous spiral conveyor fastened around a substantially horizontal rotatable shaft. A continuous peripheral ribbon is fastened to the edge of the conveyor flight substantially at right angles thereto and outside this is fastened a drum of fine screen. The feed end of the drum is closed at the edge by annular plates, so that the lower portion of the drum tends to retain a pool. The shaft passes through the drum and is provided with suitable bearings at either end. Means are provided for slowly rotating the shaft and the attached drum. Beneath the drum is a hopper for collecting the liquid and solids which pass through the screen.

Above the drum is a horizontal blow-off means through which liquid or gas may be directed to unblind the screen as it rotates. If necessary, means for rapidly and periodically interrupting the flow of gas or liquid through the blow-off means is provided. This causes the screen beneath the blow-off means to pulsate and aids in the unblinding.

As a further aid to rapid screening, means such as an air hammer or magnetic vibrator may be attached to the shaft or other suitable portion of the screen assembly to vibrate it.

Abrasion of the fine screen cloth is minimized by the fact that coarse material tends to ride through the drum on top of the horizontal spiral band at the edge of the conveyor flight rather than upon the screen itself, which is thereby rendered free to perform its major function, the release of liquid accompanied by fine solid particles.

If additional liquid is needed for the maintenance of the pool within the drum, this may be supplied by sprays passing through the shaft.

These and other features of my invention will be understood more thoroughly if reference is made to the following detailed description taken in conjunction with the accompanying drawing, in which Fig. 1 is a longitudinal elevation (partly in section) of a screen of my invention.

Fig. 2 is a section through the screen and,

Fig. 3 illustrates a modification of the feed end of the screen which should be employed when there is excess water in the pulp fed to the screen.

Referring now to Fig. 1, the screen mechanism comprises a drum 1 of fine screen fastened around the outside edge of a continuous helical conveyor 2. The helical conveyor is rigidly fastened throughout its length to a shaft 3 supported near its ends by bearings 4 and 5. On the forward edge of the helical conveyor throughout its length is rigidly fastened a horizontal helical ribbon 6. The shaft is rotatable by means of the driving pulley 7 attached to a belt (not shown), or by some other convenient means. At the feed end of the drum is a solid annular extension 8 provided with an annular weir plate 9 at its outer end. Pulp to be screened is fed in through the weir by means of a chute 10.

Underneath the drum and extending the length thereof is a hopper 11 provided with a discharge chute 12 at its lower end. At the discharge end of the drum another chute 13 is provided for carrying away the coarse material which has not passed through the screen.

In the event that liquid contained in the feed which enters through chute 10 is not sufficient in quantity to maintain a pool throughout the length of the drum the shaft may be hollow and additional liquid may be supplied to the interior of the drum through a pipe connection 14 and a stuffing box 15 so constructed that the shaft may turn within it. Additional liquid may then enter through the shaft and be introduced into the interior of the drum through apertures 16, 17 and 18 in the shaft. These apertures may be positioned at any point along the shaft and may be of any convenient number. It will be preferable, however, to place them in the shaft near the discharge end of the drum because it is at this point that a shortage of liquid usually occurs.

Extending longitudinally immediately above the drum are a set of spray pipes 19, 20 and 21 provided with apertures on their sides nearest the top of the drum. Air or water may be introduced through one or more of these spray pipes to unblind the screen as it rotates.

When blinding tends to occur to an excessive degree, rapidly rotatable butterfly valves 22, 22', 22'', or the like, may be placed in the inlet line to the spray pipes. These valves, if rotated rapidly by means such as rotating stems 23, 23', 23'', will interrupt the flow of fluid through the spray pipes and cause the fine screen on the top of the drum to pulsate.

In some cases it may be desirable to vibrate the whole drum structure to facilitate screening. In such cases this may be done conveniently by means of an air hammer 24, provided with a piston 25 which knocks against the horizontal shaft. A magnetic vibrator or a cam mechanism may be substituted as a vibrating means.

In certain cases the pulp fed to the screen may contain more liquid than is necessary to carry the finely divided particles through the screen. In such cases, it is desirable to remove the excess liquor together with a considerable portion of the fine solids by means of the mechanism illustrated in Fig. 3. In this case the annular extension 8 and the weir plate 9 are constructed as in the case of the apparatus illustrated in Fig. 1, except that the weir plate is provided with a frusto-conical member 26 which is fastened within the drum to the inside edge of the annular weir plate. Disposed around the shaft and rigidly fastened thereto is a cup shaped member 27. The cup shaped member faces outward toward the inlet of the drum.

Feed is supplied to the drum through a horizontal pipe 28 surrounding a portion of the shaft. The horizontal pipe extends into the cup shaped member. The outer end of the pipe is provided with stuffing box 29 through which the shaft passes. Also connected to the outer end of the pipe is an inlet 30 through which the feed enters the pipe.

Returning now to a discussion of the screen mechanism illustrated in Fig. 1, pulp to be screened is fed into the drum extension 8 through the chute 10 and rides through the drum on the bottom thereof impelled by the helical conveyor. The speed of rotation of the drum should be sufficiently slow that substantially none of the material will be lifted out of a pool formed in the bottom of the drum and retained by the weir plate 9 and by the flights of the helical conveyor. The speed of rotation will vary depending upon the character of material treated. I have found that for most purposes a speed of about 10 R. P. M. is proper with a screen having, for example, a diameter of approximately one foot. Excessive rotational speeds cause the material to ride around the periphery of the drum, thus causing abrasion of the screen and causing blinding.

The screen mechanism illustrated is such that the coarse material rides through the drum on top of the helical ribbon 6. The slimy or fine material tends to ride through the drum on the open screen portion and is carried through the screen by the hydrostatic head of the pool in the bottom of the drum. In this way, the coarse particles are kept substantially out of contact with the fragile screen and abrasion is reduced. The fines pass through the screen and into the hopper 11 accompanied by considerable liquid and thence pass out through the chute 12. The coarse material rides through the drum on the ribbon and is discharged through the chute 13.

The segregation of the coarse material and the slimes is shown in the section at the center of Fig. 1. Centrifugal force holds the coarsest material and the sand in the angle made by the helical screen and the ribbon, with the slimes free to fall into the pool on the screen.

As successive sections of the screen pass under the spray pipes a continuous or intermittent blast of fluid is discharged against the screen and tends to wash any fine material which has caught in the mesh back into the pool within the drum. As observed hereinbefore an excessive blinding tendency in the screen may be overcome by rapidly interrupting the flow of fluid through the spray pipes so as to cause a pulsation of the fine screen cloth.

The capacity of the screen may be increased substantially by vibrating the drum by means of an air hammer or other suitable mechanism pounding against the shaft.

Should liquid tend to drain from the pool too rapidly there will be a tendency to leave dry material near the discharge end of the drum. This condition, which tends to impair screening, may be corrected by supplying water or other washing liquid from the pipe 14 through the shaft and out the apertures 16, 17 and 18.

For optimum wet screening conditions it is essential that there be sufficient liquid present to form a pool throughout the length of the drum. Otherwise the dry material toward the discharge end of the drum will not screen freely.

As indicated hereinbefore the feed end illustrated in Fig. 3 is adapted to be used when the reverse condition occurs, that is, when the pulp contains excessive water. In such case the pulp is fed in through the inlet 30 and the pipe 28 to the bowl shaped member 27 which rotates on the shaft. A classifying action occurs in the bowl. The coarser material tends to hug the interior of the bowl and it will be discharged out of the bowl at the point 31, while the excess liquid accompanied by fines overflows the weir plate 9 and joins the liquid and fines which are screened out from the drum in the hopper 11.

The use of means to interrupt the fluids supplied to the spray pipes is optional. In many cases where the screen does not exhibit much tendency to blind the interrupting means may be dispensed with. Similarly the use of the vibrating mechanism 24 may also be dispensed with in cases where the capacity of the drum is sufficiently high without vibration.

From the foregoing description, it will be apparent that the screening mechanism of my invention performs the dual functions of screening and classification. The classification occurs upon the spiral ribbon at the edge of the conveyor, the coarsest material being held nearest to the ribbon by centrifugal action.

Although the mechanism of my invention may be used for screening and classifying material of substantially any size it presents its most pronounced advantage when operating to remove material less than 40 mesh in size. The mechanism will operate satisfactorily when the screen employed has 200 meshes or less to the linear inch.

I claim:

1. A screening device which comprises a rotatable shaft supported in an approximately horizontal position, a continuous helical conveyor fastened concentrically around said shaft, a continuous helical strip fastened to the outside edge of the conveyor approximately at right angles thereto, a perforated drum fastened around the helical conveyor immediately outside the helical strip, an unperforated extension on one end of the drum, an annular weir plate fastened to the extension and adapted to retain a pool of liquid therein, a cup shaped member fastened concentrically around the shaft in the extension adjacent the weir plate and open toward the weir plate, and means for introducing pulp into the cup shaped member at a relatively high velocity and in a direction substantially opposite the direction of flow of material over the weir plate.

2. A screening device which comprises a shaft, a continuous helical conveyor fastened to and around the shaft, means for rotating the shaft, a helical strip fastened to the outer edge of the conveyor adjacent the leading face of the conveyor and disposed at an angle thereto, a perforated substantially flexible drum fastened around and to the conveyor adjacent the helical strip, means for feeding pulp into the conveyor, damming means for retaining a pool of pulp within the conveyor, a spray disposed outside the drum and adapted to direct a stream of fluid against the drum surface above the level of the pool, and means for rapidly and periodically interrupting the flow of fluid through the spray.

3. A screening device which comprises a drum having a foraminous wall and a substantially horizontal axis of rotation, a continuous spiral conveyor disposed within the drum and having flights which extend from approximately the axis of rotation of the drum to the foraminous wall thereof, a continuous and relatively broad ribbon fastened to and extending forward from the leading edge of the conveyor and having its major surfaces substantially parallel to and adjacent to the foraminous wall, means for rotating the drum about said axis, means for feeding solids into the rear end of the drum and means for retaining a substantial pool of liquid in the drum.

CHARLES ERB WUENSCH.